United States Patent [19]

Swearingen

[11] 4,287,758
[45] Sep. 8, 1981

[54] SHAFT MOUNTING DEVICE AND METHOD

[75] Inventor: Judson S. Swearingen, Malibu, Calif.

[73] Assignee: Rotoflow Corporation, Inc., Los Angeles, Calif.

[21] Appl. No.: 58,859

[22] Filed: Jul. 19, 1979

[51] Int. Cl.³ .............................................. G01L 5/12
[52] U.S. Cl. .................................. 73/862.49; 308/160
[58] Field of Search ............. 73/140, 136 A; 308/160, 308/161, 162

[56] References Cited

U.S. PATENT DOCUMENTS

| 1,998,450 | 4/1935 | Davis | 73/140 |
| 2,043,790 | 6/1936 | Baker | 308/160 |
| 3,828,610 | 8/1974 | Swearingen | 73/140 |

Primary Examiner—Donald O. Woodiel

Attorney, Agent, or Firm—Lyon & Lyon

[57] ABSTRACT

A device for accommodating and measuring thrust loads on a rotatably mounted shaft wherein the thrust loading is in either axial direction. The rotatably mounted shaft has two shoulders facing in opposite axial directions which cooperate with a pair of thrust bearings to constrain the shaft to a limited range of axial movement. Thrust rings associated with the shoulders are positioned between the shoulders and the bearings and are biased toward the bearings by resilient members to resist the axial movement of the shaft between the bearings. Sensing systems are arranged to measure the axial displacement of the shaft and provide input to thrust monitoring and control systems. A method for preventing damage to labyrinth seals on the shaft during start up of the equipment is also provided.

13 Claims, 5 Drawing Figures

SHAFT MOUNTING DEVICE AND METHOD

BACKGROUND OF THE INVENTION

The present invention is directed to the mounting of a rotatable shaft with particular attention to the thrust loading and control thereof.

It is often advantageous to measure the thrust load carried by the thrust bearings of a rotating shaft. The monitoring of such loads can enable the operator to avoid damaging thrust conditions and thereby substantially extends the life of the bearings and other equipment subjected to these loads. Such devices have tended to be of marginal effectiveness unless they included very sophisticated measuring equipment for measuring the displacement of the shaft under axial load. This sophisticated equipment was necessary because of the very limited axial travel afforded such assemblies. Furthermore, thrust monitoring systems were often associated with propulsion devices such as screw shafts on ships and propeller shafts on airplanes. Consequently, these devices have been designed to sense thrust load only in one direction. For the foregoing reasons, early thrust metering devices have lacked the versatility, accuracy and reliability desired.

To overcome a number of the foregoing difficulties, devices disclosed in U.S. Pat. Nos. 3,828,610 and 3,895,689 to Swearingen entitled THRUST BEARING LUBRICANT MEASUREMENT AND BALANCE were developed. These devices employed the measurement of lubricant pressures as a means of sensing axial thrust. However, it is often desirable to employ a mechanical means for accomplishing such measurement. Furthermore, certain axial displacement of such shafts can be used advantageously to protect the shaft assembly, bearings and seals.

SUMMARY OF THE INVENTION

The present invention is directed to a shaft mounting system capable of resiliently mounting a shaft against thrust loads in either direction. The system includes means for accurately and simply measuring the magnitude of the applied thrust loads. Means are also provided for using the thrust measurement to control the thrust loads during start-up and full speed operation. Thrust bearings are used in conjunction with oppositely facing shoulders located on the associated shaft to hold the shaft axially against anticipated thrust loads. Resilient devices bias the shaft to a central position between the bearings while the shaft is allowed to move to a limited extent against the resilient devices.

Through the arrangement of the present invention, several advantages are obtained. First, the axial movement of the shaft in response to thrust loads is magnified through the presence of the resilient devices. Thus, less sophisticated sensing equipment is necessary for monitoring the movement of the shaft in an axial direction. By reducing the necessary sophistication of the meter and equipment, reliability and accuracy can be increased. The resilient devices may also be of a non-linear nature to provide maximum and minimum axial displacement to best suit the controls and sensors associated with this system. Furthermore, the resilient devices may also be so structured as to provide a wide range of preload including no preload at all on the thrust bearings. The bi-directional sensing capabilities of the system make the present invention useful with many devices such as turboexpanders, compressors, centrifugal pumps, and the like. A modification to the shaft may also be employed as a means for conditioning the output signal resulting from axial displacement of the shaft. The measurements thus obtained can be used to help protect the shaft assembly, the bearings, and the seals.

Accordingly, it is an object of the present invention to provide an improved shaft mounting system.

Another object of the present invention is to provide a method for reducing start-up damage to a rotating shaft.

Other and further objects and advantages will appear hereinafter.

DETAILED DESCRIPTION OF THE PREFERRED EMBODIMENT

Figure 1:
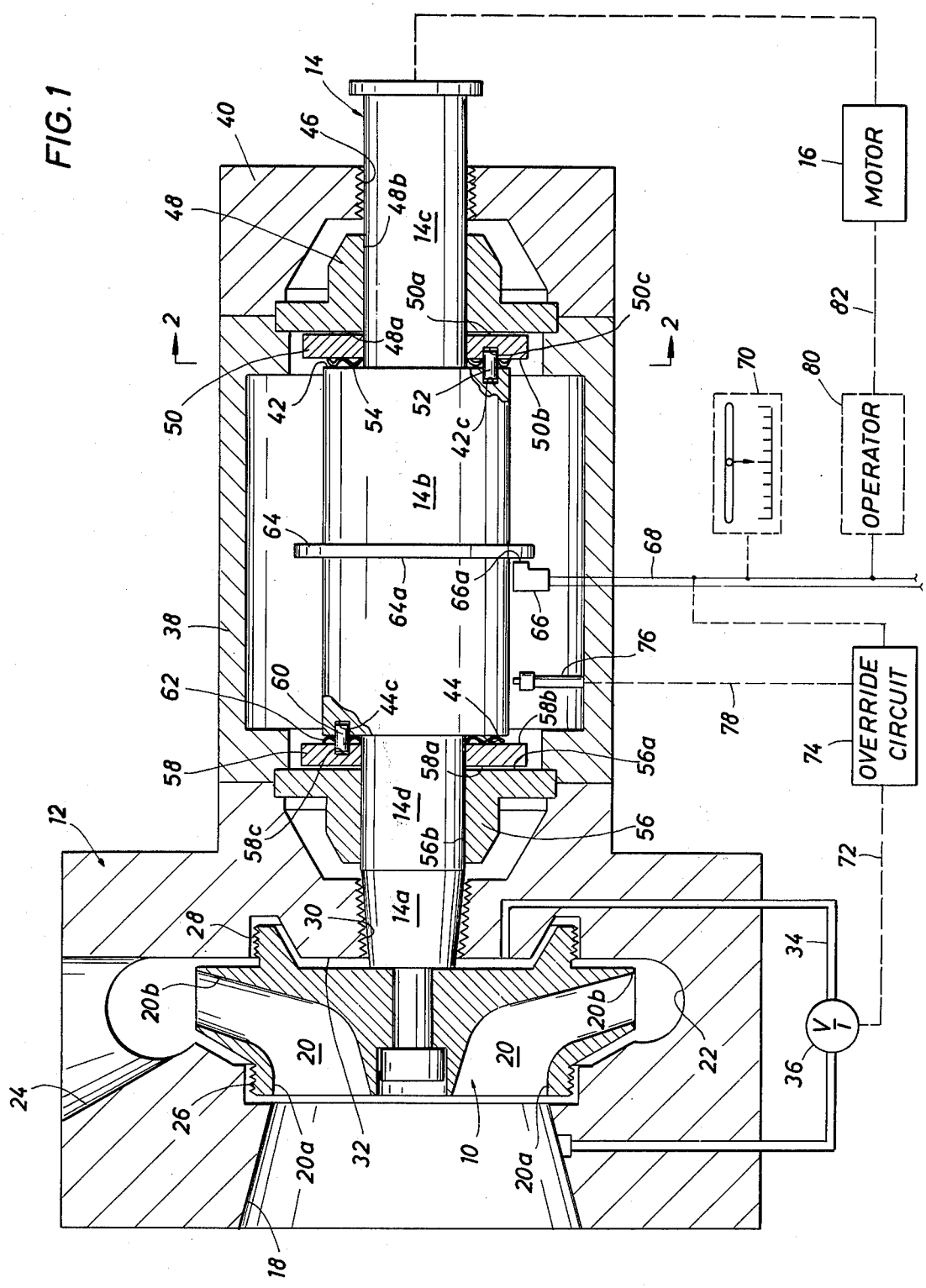
FIG. 1 is a partially diagrammatic view in longitudinal cross-section of a rotary apparatus having a thrust detection and control system in accordance with the present invention.

Referring now to FIG. 1, there is shown a rotary apparatus in the form of a centrifugal compressor. While the invention is particularly well adapted for use in connection with rotary fluid handling devices such as turboexpanders, compressors, and the like, it can be used in connection with any rotary device subject to varying thrust loads, whether balanced or unbalanced. The environment of the preferred embodiment includes, by way of example, a compressor having a rotor 10 and a surrounding rotor housing 12. The rotor 10 is driven by a shaft 14 which in turn is driven by a motor 16. The rotor housing 12 has a generally axially directed inlet 18 for receipt of gases to be compressed. The inlet 18 communicates with inlet ports 20a of a series of passageways 20 through the rotor 10. The passageways 20 are curved along their length to form a generally axial orientation at their inlet ports 20a and a generally radial orientation at their outlet ports 20b. The outlet ports 20b are in communication with a surrounding annular space or volute 22 in the housing 12, which in turn communicates with a housing outlet 24. As is well known in the art, the rotation of a rotor 10 driven by the shaft 14 draws gases through the passageways 20 for centrifugal compression.

The rotor 10 is sealed with respect to the rotor housing 12 by a pair of annular labyrinth-type seals 26 and 28 located on the circumferential surfaces on either side of the outlet ports 20b. The shaft 14 has a tapered section 14a with the smaller end adjacent the rotor 10. A corresponding tapered labyrinth-type seal 30 is provided in the rotor-housing 12 about the shaft section 14a. The foregoing labyrinth seals 26, 28 and 30 are of a type designed to permit some fluid leakage. The leakage through seals 26 and 28 would be in a direction longitudinally outwardly from the high pressure area 22. Such leakage can create a variation in the thrust imparted to the shaft 14 and can provide a means for controlling such axial thrust. The high pressure fluid leaking past the seal 26 simply becomes entrained in the incoming gas to re-enter the rotor passageways 20. However, when fluid leaks past the seal 28, it enters an area 32 behind the rotor 10. This area 32 is substantially closed by the seal 30. Consequently, fluid pressure may build up in the area 32. It is this pressure in the area 32 which can contribute to variation in thrust loading on the rotor 10 and can also be used to control the thrust if selectively vented. For this purpose, a passageway 34 extends from the area 32 to the relatively low pressure area formed by the inlet 18 of the housing 12. A throttling valve 36 is provided in the line 34. By increasing the opening through the valve 36, relatively high pressure fluid in area 32 can be vented to the housing inlet 18. This permits an increase in thrust on the shaft 14 in a right-hand direction as the apparatus is viewed in FIG. 1. Conversely, by further closing valve 36, fluid pressure can be permitted to build up in space 32. This exerts a left-hand thrust on the shaft 14 also as viewed in FIG. 1. This arrangement is more fully described in U.S. Pat. No. 3,895,689, the disclosure of which is incorporated herein by reference.

The major portion of the shaft 14 is encased in the housing formed by the portion of the rotor housing 12 opposite the inlet 18 and by two additional housing sections 38 and 40 affixed to the housing 12 in any suitable manner. The shaft 14 has an enlarged central cylindrical section 14b defining at its opposite ends a pair of annular shoulders 42 and 44. These shoulders 42 and 44 face axially outwardly in opposite directions. Naturally, the arrangement of the shoulders may be rearranged to better fit the needs of the system. It is required only that the shoulders be facing in the opposite direction from one another to provide thrust surfaces for the bearings. Adjacent the shoulder 42 there is a relatively small diameter cylindrical section 14c of the shaft 14 which extends outwardly through the housing section 40 and is sealed relative to the housing section 40 by a labyrinth type seal 46. Adjacent to the shoulder 44 there is a cylindrical shaft section 14d. This section 14d interconnects the large central section 14b with the tapered section 14a.

The shaft 14 is supported in the housing for rotation relative thereto by longitudinally spaced first and second bearing means. The actual bearings may be of any conventional thrust type mechanism capable of being amended to receive the devices employed here. The first bearing means includes in this preferred embodiment an annular bearing member 48 coaxially surrounding the shaft section 14c and rigidly carried by the housing sections 38 and 40. Adjacent this first bearing means, there is a thrust ring 50 which also coaxially surrounds the shaft section 14c between bearing member 48 and shoulder 42. The radially inwardly facing surface 48b of the bearing member 48 serves as a bearing surface to cooperate with the opposed outer surface of the shaft section 14c to support the thrust imposed by the shaft. To this end, the opposed axially facing surfaces 48a and 50a of the bearing member 48 and the thrust ring 50 serve as the thrust bearing surfaces for supporting the thrust loads between the shaft 14 and the housing 12, 38 and 40 when the shaft is forced to the right. In accordance with standard practice in the art, the bearing may be supplied with a suitable lubricating system.

Figure 2:
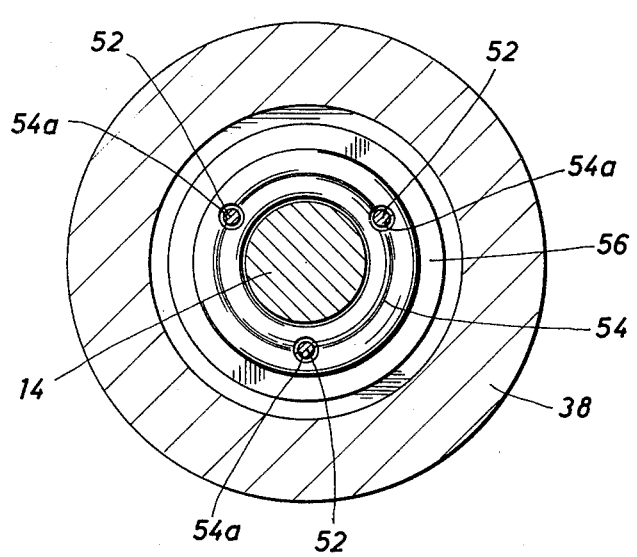
FIG. 2 is a transverse cross-sectional view taken along line 2—2 of FIG. 1.

The bearing member 48 and the thrust ring 50 are designed to permit axial movement with the shaft 14. However, it is preferred that the thrust ring 50 rotate with the shaft 14. Consequently, the shoulder 42 includes three circumferentially spaced recesses, one of which is shown at 42c, extending into the shoulder 42. Likewise, the surface 50b of the ring 50 has three recesses 50c, each of which is aligned with a respective one of the recesses 42c. Pins 52 are slideably received in the aligned recesses 42c and 50c for coupling the thrust ring 50 to the shaft 14. These pins allow a certain amount of axial displacement between the shaft 14 and the thrust ring 50. As more fully described below, an annular spring is disposed in the space between the shoulder 42 and the surface 50b of the thrust ring 50. This spring 54 has three holes 54a to permit the pins 52 to pass therethrough as best seen in FIG. 2.

The second bearing means, which coaxially surrounds the shaft section 14b, is substantially identical to but the mirror image of the first bearing means described immediately above. In particular, the second bearing means includes a bearing member 56 associated with a thrust ring 58. This bearing member 56 is also rigidly carried by the housing and has an axially inwardly facing thrust bearing surface 56a and a radially inwardly facing radial bearing surface 56b. The thrust ring 58 is positioned between the bearing member 56 and the shoulder 44. The thrust ring 58 has an axially outwardly facing thrust bearing surface 58a which opposes the surfaces 56 to support thrust loads between the shaft 14 and the housing. In this manner, this second bearing means supports thrust loads in a second direction, i.e. to the left as seen in FIG. 1.

As with the first thrust ring 50, circumferentially spaced pins 60 are disposed in opposed recesses 44c and 58c to fix the thrust ring 58 to rotate with the shaft 14. Spring 62 is provided with three holes for receiving the pins 60.

The springs 54 and 62 are designed to act as resilient members between the shaft and the bearing means. Forced axial movement of the shaft 14 will result in compression of one or the other of springs 54 and 62 to resist axial movement of the shaft and transmit the load to the thrust rings 50 or 58. The spring illustrated in the preferred embodiment includes an annular wave form compression spring disclosed in the annular space between the shoulders and the thrust rings.

The positioning of the springs between the thrust rings and the shoulders located on the shaft provide substantial advantage to the present invention. Without some form of resilient means, the amount of axial movement resulting from any thrust load will be very small and difficult to measure. However, with the resilient means in place, the reaction strain of the shaft to any given thrust load is substantially greater and can be more readily observed. Furthermore, the spacing provided by the springs allows for substantial thermal expansion without reaching an interference condition. Ignoring any preloading, the springs and bearings act independently as thrust resistors. The springs may also be placed in an initial preloaded condition to ensure substantial resistance to movement where desired. Non-linear springs may also limit axial movement where desired. One example of a non-linear type spring compatible with the present system is the Belleville-type spring.

The axial movement of the shaft 14 may be detected by means of an anomaly on the cylindrical surface of the shaft such as a central section 14b of the shaft 14 which is provided with a radially extending flange 64. The flange 64 defines a radially extending surface which will move with the shaft under thrust loads. A means for sensing axial displacement of the shaft 14 in the form of a proximity transducer 66 is mounted in a fixed position with respect to the housing section 38. This device 66 is capable of monitoring the distance between the detector face 66a thereof and the measurement 64a of the flange 64. In this way, axial movement of the shaft 14 can be detected and translated into the thrust loading.

The signal supplied by the proximity transducer 66 may be transmitted via a lead wire 68 from the transducer to a number of control devices or sub-systems. The first of these is a readout device 70 which provides a visible indication of the direction and magnitude of unbalanced thrust loads on the shaft. As diagrammatically indicated by the line 72, the signal from the transducer 66 may also be conveyed, via a suitable circuit 74 to the valve 36. As previously mentioned, the direction and magnitude of thrust on the rotor 10, and consequently on the attached shaft 14, may be adjusted by throttling of the valve 36. When an unbalanced thrust load is imposed on shaft 14, the appropriate one of the springs will yield providing shaft movement. Since such movement is detected by the proximity transducer 66, and its signal is immediately to the value 36, a restorative force for balancing the thrust load can be initiated before the bearing becomes overloaded.

The circuitry 74 which operates the valve 36 in accordance with the signal from the transducer 66 is designed to correlate the signalling and the throttling of the valve so as to keep the thrust on the rotar 10 and the shaft 14 during ordinary operation. When the thrust load is so balanced, the central section 14b of the shaft is centered in the housing section 38 and the tapered shaft section 14a has its outer surface disposed in fairly close proximity to the labyrinth seal 30 of the housing. However, during startup of the apparatus, the shaft may be subject to some unsteady state conditions detrimental to the seal. Consequently, it may be desirable to urge the shaft slightly to the right during startup to enlarge the clearance between the section 14a and the seal 30 to avoid damage. For this purpose, the circuit 74 is shown to be provided with an override feature. The cone angle of the seal 30 and the allowed axial displacement of the shaft 14 must be such that neither excessive space is allowed nor jamming of the seal can occur.

As diagrammatically indicated at 76, a suitable device is provided for monitoring the rotational speed of the shaft 14 and transmitting that information as indicated at 78 to the circuit 74. In accordance with well known principles of electronics, the circuit 74 is designed so that it will override the signal of the transducer 66 when the speed of the shaft is below a certain limit. This serves to keep the value 36 in an open position so that the shaft 14 can drift slightly to the right. When the signal from the device 76 indicates that the shaft has reached its full operational speed, the override will be deactivated so that the signal from the detector-actuator 66 will again control the operation of the valve 36.

To automatically prevent bearing overload, an operator 80 may be placed in the line 82 controlling the motor 16. When the signal from the transducer 66 reaches a certain level, the motor may be shut off by the operator 80.

The foregoing discussion has been directed to the detection and control of thrust loads which may be caused by various factors involved in the normal operation of the rotating device. However, the system is also useful in detecting excessive wear of the bearing members. As the thrust bearing surfaces 50a, 48a, 56a and 58a wear, the load supporting clearance between respective pairs of these surfaces are enlarged permitting greater axial play in the shaft 14. Since the proximity transducer 66 is designed to detect axial thrust via measurement of the axial shaft movement, it can also detect other factors such as the aforementioned bearing wear. The axial play of the shaft may be observed by noting the readout device 70. Furthermore, if the wear becomes pronounced, the drift in the shaft 14 will activate the operator 80 and shut down the apparatus.

In various systems it may be desirable to provide different types of mathematical relationships between the output signal of the proximity transducer 66 and the movement of the shaft 14. For example, it may be desired that the output signal of the proximity transducer 66 be of a non-linear function of thrust or axial shaft movement. It may be desired that the signal from the proximity transducer 66 increase non-linearly with shaft movement to provide relatively large increments of opening and closing of the valve 36 when the thrust is near the upper end of the range accommodated by the springs 54 and 62. The present invention permits this to be done by mechanical means, and without expensive or complicated electronic circuitry or the like. For example, springs 54 and 62 may be non-linear springs, either of the type shown or of some other type such as Belleville springs.

Figure 3:
FIG. 3 is an enlarged detail of a second embodiment of the shaft measurement section and related detector-actuator means.

Another means of mechanically varying the relationship between shaft movement and the output signal of the proximity transducer 66 is accomplished by varying the configuration of the measurement section of the shaft 14. As shown in FIG. 3, the shaft 14' is provided with a tapered or frusto-conical measurement section 84. The outer surface of the section 84 would be linear in longitudinal cross-section. The proximity transducer 66' differs from the device 66 in FIG. 1 in that its detector face 66a' faces radially inwardly, rather than axially to oppose the tapered measurement section 84 of the shaft 14'. As section 84 moves axially relative to the face 66a' the distance between the latter face and the portion of section 84 immediately aligned therewith will vary. Although the output signal of the pressure transducer 66' will be a linear function of axial shaft movement, the ratio between the signal magnitude and the amount of such movement can be varied by changing the angle of inclination of the surface 84.

Figure 4:
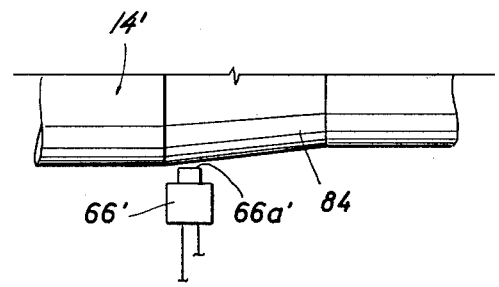
FIG. 4 is an enlarged detail similar to that of FIG. 3 showing a third embodiment of the shaft measurement section.

FIG. 4 likewise shows a proximity transducer 66' whose face 66a' faces radially inwardly with respect to the shaft 14". Like shaft 14' in FIG. 3, the shaft 14" has a radially and longitudinally tapered measurement section 86. However, section 86 is not strictly frusto-conical, and thus not linear in longitudinal cross-section, but rather is curved near its longitudinal extremities as indicated at 86a and 86b. Thus, the relationship between the distance from the proximity transducer face 66a' and the immediately aligned portion of the measurement surface defined by section 86 would not be linear. Accordingly, the output signal of the proximity transducer 66' would be a non-linear function, e.g. an exponential function, of axial shaft movement.

Figure 5:
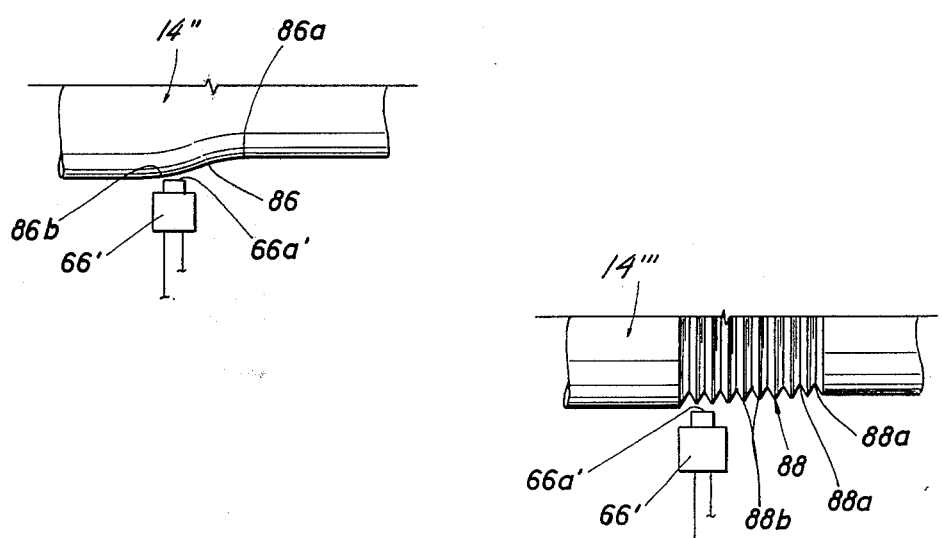
FIG. 5 is an enlarged detail similar to those of FIGS. 3 and 4 showing a fourth embodiment of the shaft measurement section.

FIG. 5 illustrates still another modification in which the shaft 14''' has a measurement section 88 with an outer surface which is saw-toothed in longitudinal section. This surface would define a series of concavities 88a alternating with a series of apexes 88b. However, the diameters of the concavities 88a are incrementally decreased from left to right as are the diameters of the apexes 88b. Thus, the output signal of the proximity transducer 66' would increase or decrease in step-like increments with the axial movement of the shaft 14'''.

Numerous other modifications of the preferred embodiments disclosed above will suggest themselves to those of skill in the art. These may include not only additional variations in the modification of the measurement section of the shaft, but also modifications of other portions of the apparatus illustrated in FIG. 1. More generally, the invention could be applied not only to other types of rotary fluid handling devices, such as turboexpanders, but to any type of apparatus having one or two pairs of thrust bearing members which may be subjected to varying loads in use. Accordingly, it is intended that the scope of the present invention be limited only by that of the appended claims.

What is claimed is:

1. A shaft mounting device comprising
a housing;
two thrust bearing members fixed in said housing;
a shaft rotatably mounted in said thrust bearing members and being slideably disposed therein, said shaft including two radial surfaces thereon facing in opposite axial directions;
two thrust rings slideably disposed on said shaft adjacent said radial surfaces, said thrust bearing members each abutting one said thrust ring;
means for resiliently holding each said thrust ring spaced axially on said shaft from said radial surface;
means fixed relative to said housing for sensing axial displacement of said shaft.

2. The shaft mounting device of claim 1 wherein said two radial surfaces on said shaft are shoulders on a section of said shaft of increased diameter.

3. The shaft mounting device of claim 1 further including means for fixing said thrust rings to rotate with said shaft.

4. The shaft mounting device of claim 1 wherein said means for resiliently holding each said thrust ring includes springs positioned between said radial surfaces and said thrust rings.

5. The shaft mounting device of claim 4 wherein said springs have a non-linear force-displacement relationship.

6. The shaft mounting device of claim 1 wherein said means fixed relative to said housing for sensing the axial displacement of said shaft includes a proximity transducer.

7. A shaft mounting device comprising
a housing;
two thrust bearing members fixed in said housing;
a shaft rotatably mounted in said thrust bearing members and being slideably disposed therein, said shaft including two radial surfaces thereon facing in opposite axial directions;
two thrust rings slideably disposed on said shaft adjacent said radial surfaces, said thrust bearing members each abutting one said thrust ring;
means for resiliently holding each said thrust ring spaced axially on said shaft from said radial surfaces;
means fixed relative to said housing for sensing axial displacement of said shaft, said means fixed relative to said housing for sensing the axial displacement of said shaft including a proximity transducer, said shaft including an anomaly on the surface thereof the position of which is sensed by said proximity transducer.

8. The shaft mounting device of claim 7 wherein said anomaly includes a raised cylindrical ridge.

9. The shaft mounting device of claim 7 wherein said anomaly includes a tapered section on said shaft.

10. The shaft mounting device of claim 9 wherein said tapered section is frusto conical.

11. The shaft mounting device of claim 9 wherein said tapered section is contoured to induce a non-linear response in said proximity transducer responsive to axial movement of said shaft.

12. A shaft mounting device comprising
a housing;
two thrust bearing members fixed in said housing;
a shaft rotatably mounted in said thrust bearing members and being slideably disposed therein, said shaft including two radial surfaces thereon facing in opposite axial directions;
two thrust rings slideably disposed on said shaft adjacent said radial surfaces, said thrust bearing members each abutting one said thrust ring;
means for resiliently holding each said thrust ring spaced axially on said shaft from said radial surfaces;
means for fixing said thrust rings to rotate with said shaft, said thrust ring fixing means including pin slideably extending into cavities in said thrust rings and said shaft.

13. A shaft mounting device comprising
a housing;
two thrust bearing members fixed in said housing;
a shaft rotatably mounted in said thrust bearing members and being slideably disposed therein, said shaft including two radial surfaces thereon facing in opposite axial directions;
two thrust rings slideably disposed on said shaft adjacent said radial surfaces, said thrust bearing members each abutting one said thrust ring;
means for resiliently holding each said thrust ring spaced axially on said shaft from said radial surface;
means fixed relative to said housing for sensing axial displacement of said shaft, said shaft including an anomaly on the surface thereof the position of which is sensed by said means fixed relative to said housing for sensing the axial displacement of said shaft.

* * * * *